Sept. 4, 1962     HANS-WOLFGANG MÜLLER     3,052,825
CIRCUIT ARRANGEMENTS FOR RECORDING MEASURING INSTRUMENTS
Filed Sept. 14, 1959     2 Sheets-Sheet 1

INVENTOR.
HANS-WOLFGANG MÜLLER
BY

INVENTOR.
HANS-WOLFGANG MÜLLER
BY

United States Patent Office 3,052,825
Patented Sept. 4, 1962

---

3,052,825
CIRCUIT ARRANGEMENTS FOR RECORDING MEASURING INSTRUMENTS
Hans-Wolfgang Müller, Uberlingen (Bodensee), Germany, assignor to Bodenseewerk Perkin-Elmer & Co., G.m.b.H., Uberlingen (Bodensee), Germany
Filed Sept. 14, 1959, Ser. No. 839,844
5 Claims. (Cl. 317—146)

This invention relates to a recording measuring instrument. More particularly, the invention is concerned with such a measuring instrument in which a measured value is continuously recorded on a chart as a function of time or as a function of a second quantity which is continuously varied with the chart movement. The invention is useful, for example, with recording spectroscopes in which the spectrum is continuously scanned and the absorption or the intensity of radiation is automatically recorded on a chart as a function of the wave length.

A co-pending application by Hans Martin Bolz for "Recording Measuring Instrument," Serial No. 827,764 filed July 17, 1959, discloses apparatus whereby marks on the chart are scanned by scanning members arranged on the recording device by means of which switch operations for controlling the apparatus are actuated.

With a preferred embodiment of the Bolz application the scanning is effected by exploiting the difference in electrical conductivity between the marks and the chart. For example, two spring contacts slide over the chart and in passing the mark, e.g., a pencil streak, are connected with each other as a result of its low electrical resistance.

The present invention refers to an arrangement of this kind.

Experiments have shown that normal colour or ink pens are not suitable for making the marks because they cause only a relatively small variation in resistance. Even with the usual pencils, the resistances are still in the order of 100,000 ohms, where the contact pressure must be high. With certain pencils (e.g., Schwan-Stabilo No. 8008), however, with a streak breadth of 0.5 to 1 mm. and a large streak density, which can be produced by repeated applications, resistances of about 3,000 ohms can be achieved. The contact surfaces, thereby, need only amount to a fraction of a square millimeter. With the passage of the contacts, a light smearing of the streak edges occurs which causes an increase in the electrical resistance of the mark. After scanning for a hundred times a mark resistance of 30,000 ohms was measured. Even after lightly erasing, the resistance rose to more than 1 megohm.

It will be readily understood that certain difficulties occur in practice to produce a clean switching impulse by means of such marks which, on the one hand, have a very high electrical resistance and, on the other hand, have an extremely fluctuating resistance. A bridge compensation of the resistances is impossible, inasmuch as the resistances have a very high ohmic resistance and, since high input voltages are not feasible for obvious reasons, the sensitivity of the bridge would be too low.

The invention has for its object the achievement with recording instruments of the present type of a clean switching impulse which can be produced independently of the actual size of the resistance.

For this purpose it has been shown to be of particular advantage to provide switching impulses created by means of a feed-back circuit arrangement. The marks enter into the feed-back circuit as resistances and change the intensity of the feed-back.

Such a feed-back circuit arrangement has a characteristic that corresponds to a great degree with the demands made here.

An embodiment of the invention is depicted in the drawings and described as follows.

Figure 1:
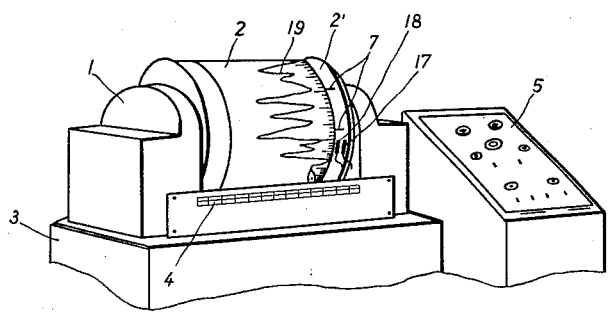
FIG. 1 shows a schematic diagrammatic view of a recording spectroscope with a scanning device conceived and constructed according to the invention.

Numeral 1 designates a recording drum around which a tape 2 of translucent recording paper is placed. The recording drum 1 is rotated as a spectrum is continuously scanned by a sprectroscope. The spectroscope is accommodated in a housing and is not further represented. A pointer moves axially along a graduated dial 4 in accordance with the emission or absorption measured and a pen records on the recording paper 2 the emission or absorption of the sample as a function of the wave length. Numeral 5 designates the control desk provided for the operation of the spectroscope.

Marks 7, which may be produced by pencil streaks, are provided on the edge 2' of the recording paper. The scanning of the marks 7 is effected by purely electrical means. Use is made here of the fact that a pencil streak has an electrical resistance which is smaller by several tenth powers than that of the recording paper 2. The two parallel contact springs 17, 18 slide on the edge 2' of the recording paper 2. Upon passing of a mark 7 the contacts are connected electrically. A switching operation can be actuated thereby.

Figure 2:
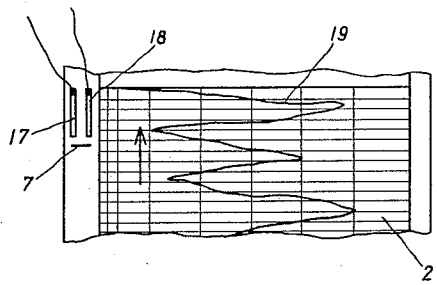
FIG. 2 shows a recording chart with a mark and contacts against the chart for scanning the mark.

One result of the switching operation may be to reverse the direction of movement of the drum 1 and the direction of scanning of the spectrum. Thus the plotted curve 19 (FIGS. 1 and 2) is recorded in a forward direction up to the mark and once again in a reverse direction.

Figure 4:
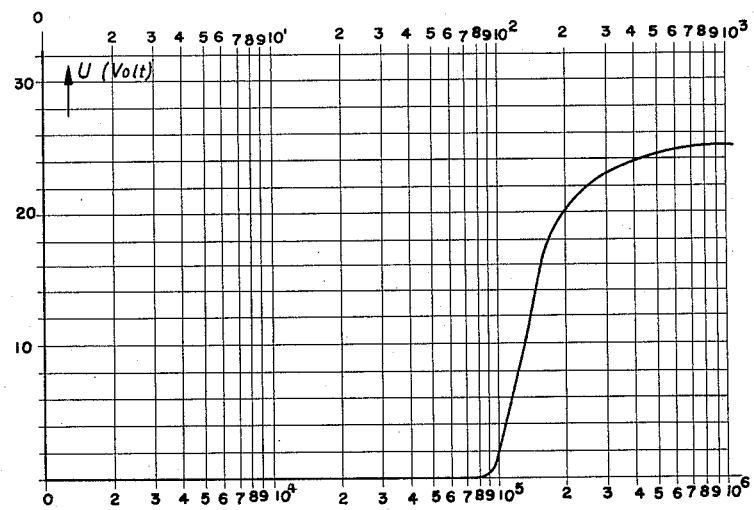
FIG. 4 shows the relationship between the output voltage U and the logarithmically plotted resistance of the mark.
Figure 3:
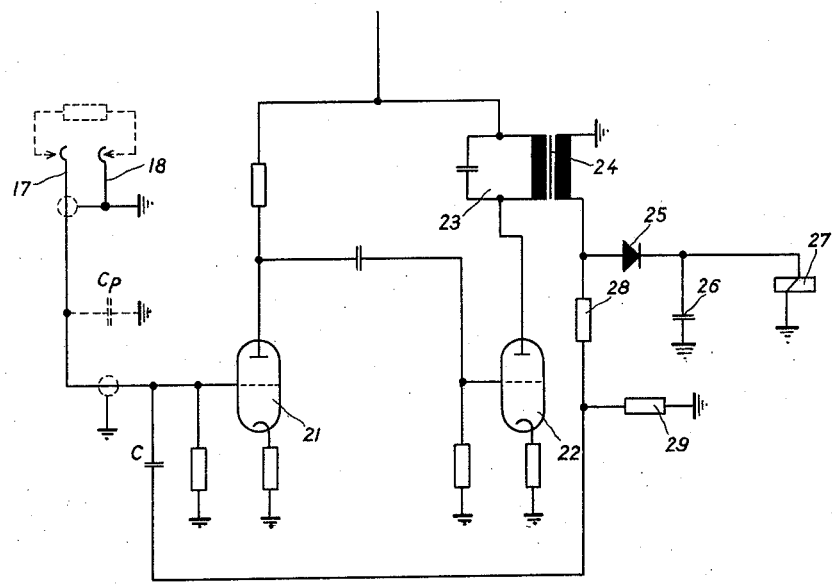
FIG. 3 shows a circuit arrangement according to the invention.

In FIGURE 4 the output voltage U of the circuit of the invention is scaled against the logarithmically plotted resistance R of the mark. It will be recognized that the voltage U is null within a very wide range of resistance from 0 up to about 80,000 ohms. If this resistance value is exceeded the voltage rises steeply to a large value of up to 25 volts, so that a relay can be operated with considerable safety. From a resistance of $R=200,000$ ohms, the voltage changes only slightly.

Two triodes are designated by numerals 21 and 22. An oscillatory circuit 23 is arranged in the anode circuit of triode 22, whose inductance is formed by the primary winding of a transformer 24. The secondary voltage of the transformer 24, feeds a relay 27 via a rectifier 25 and a band-pass condenser 26. The relay supplies the switching impulse for the apparatus. The secondary voltage is also impressed via a purely resistive voltage divider 28, 29, and a substantially capacitive voltage divider C, Cp to the grid of triode 21. The grid of the triode 22 is fed by the anode current of triode 21.

The capacitive voltage divider is formed by the coupling condenser C and the distributed capacity to ground Cp of a shielded lead wire to two sliding contacts 17, 18. The contacts 17, 18 lie on the chart and are conductively connected with each other on the passage of the mark by its electrical resistance R.

As long as the contacts 17, 18 are separated the circuit is self-excited and the relay 27 energized. The feed-back from triode 22 is interrupted when the contacts 17, 18 are connected through the resistance R and the capacity Cp is effectively short-circuited. The relay releases. By means of the working of the normally closed contact of the relay 27, certain functions of the apparatus can then be controlled.

The sudden break in the feed-back is favoured in that, by connecting a pure resistance in parallel, the feed-back is not completely free of phase shift.

I claim:

1. In a recording instrument comprising a chart, chart drive means, means for recording information on said chart and electrically conductive marks on said chart at predetermined places thereon, the improvement which comprises electrically conductive scanning means in contact with said chart and adapted to be bridged by said marks; switching circuit means including a feedback circuit, at least a portion of said feedback circuit being in electrical parallel relationship with said scanning means; and switching means controllable by said switching circuit means by the passage of each of said marks.

2. The apparatus of claim 1 wherein said switching circuit means is an oscillatory circuit.

3. The apparatus of claim 2 wherein said switching circuit means comprises a pair of triodes and wherein said feedback circuit is connected between the anode of one triode and the grid of the other.

4. The apparatus of claim 3 wherein said feedback circuit includes a voltage divider supplying said grid from a central tap and wherein each of said marks substantially short-circuits one side of said voltage divider.

5. The apparatus of claim 4 wherein said oscillatory circuit includes a transformer primary as an inductance and wherein the secondary of said transformer controls the switching means.

References Cited in the file of this patent

UNITED STATES PATENTS 2,912,052    Maltby _____ Nov. 10, 1959